Nov. 17, 1970 R. H. CRAWFORD ET AL 3,541,543

BINARY DECODER

Filed July 25, 1966

3 Sheets-Sheet 1

BINARY DECODER

Filed July 25, 1966

| | A | B | C | D | $L_1$ | $L_2$ | $L_3$ | $L_4$ | $L_5$ | $L_6$ | $L_7$ | $L_8$ | $L_9$ | $L_{10}$ | $L_{11}$ | $L_{12}$ | $L_{13}$ | $L_{14}$ | $L_{15}$ |
|---|---|---|---|---|---|---|---|---|---|---|---|---|---|---|---|---|---|---|---|
| 0 | 0 | 0 | 1 | 1 | X | X | X | X | | X | X | | X | X | | X | X | X | X |
| 1 | 0 | 1 | 0 | 0 | | X | | | X | | | X | | | X | | | X | |
| 2 | 0 | 1 | 0 | 0 | X | X | | | | X | X | X | | X | | | X | X | X |
| 3 | 0 | 1 | 1 | 0 | X | X | | | X | X | X | | | | X | X | X | | |
| 4 | 0 | 1 | 1 | 1 | X | | X | X | | X | X | X | X | | | X | | | X |
| 5 | 1 | 0 | 0 | 0 | X | X | X | X | | | X | X | | | | X | X | X | |
| 6 | 1 | 0 | 0 | 1 | X | | | X | | | X | X | X | X | | X | X | X | X |
| 7 | 1 | 0 | 1 | 0 | X | X | X | | | X | | | X | | | X | | | X |
| 8 | 1 | 0 | 1 | 1 | X | X | X | X | | X | X | X | X | X | | X | X | X | X |
| 9 | 1 | 1 | 0 | 0 | X | X | X | X | | X | X | X | X | | | X | | | X |

INVENTOR
ROBERT H. CRAWFORD
JAMES R. BIARD
E. Mickey Hubbard
ATTORNEY

Nov. 17, 1970 R. H. CRAWFORD ET AL 3,541,543

BINARY DECODER

Filed July 25, 1966 3 Sheets-Sheet 3

United States Patent Office 3,541,543
Patented Nov. 17, 1970

3,541,543
BINARY DECODER
Robert Hudson Crawford and James R. Biard, Richardson, Tex., assignors to Texas Instruments Incorporated, Dallas, Tex., a corporation of Delaware
Filed July 25, 1966, Ser. No. 567,459
Int. Cl. H03k 13/243, 13/25
U.S. Cl. 340—324 26 Claims This invention relates generally to semiconductor devices, and more particularly relates to a decoder for converting binary data to alphanumeric data and the alphanumeric data to visual character data which can be fabricated on a single substrate as an integrated circuit using MOS devices.

Substantially all data handling systems utilize binary coded data. In order to feed information to such a system, it is necessary to first convert from human language, that is alphanumeric information, to the binary language of the system. Then in order to receive information from the data system, the binary language of the system must be converted back to the human language.

This invention is concerned with an improved binary-to-alphanumeric decoder fabricated in integrated circuit form using MOS transistor devices.

An important object of this invention is to provide such a device requiring a minimum number of fabrication steps.

Another object of the invention is to provide such a device having a high speed of operation.

A further object is to provide such a device adapted to directly drive the base of a transistor used to control current to a load.

Another important object of the invention is to provide such a device adapted to drive a matrix of light sources so as to convert the input binary data to visual alphanumeric data.

These and other objects are accomplished in accordance with this invention by forming a matrix of MOS type transistors on a common substrate. The transistors are arranged in a pattern such that the gates of the devices are aligned in a number of parallel input rows equal to twice the number of binary digits. All gates in a row are common and form a binary input. Both a true and complement input is provided for each binary digit. The MOS transistors are also arranged in a number of output rows equal to the number of alphanumeric characters and the rows are arranged orthogonal to the input rows. The drains of all transistors in each output row are common and form an alphanumeric output, and each row of common drains is connectable through a resistance to a voltage supply. The sources of all transistors in the matrix are common. Each output row has a transistor located in only one-half of the input rows as determined by the binary code applied to the common gates of the transistors in the respective input rows. If any one of the transistors in a particular output row is turned "on," the alphanumeric output is essentially the potential of the source voltage, but if all are turned "off," the alphanumeric output is essentially at the drain voltage. Of course, no two output rows have transistors in the same combination of input rows so that for every combination of binary input values, a different alphanumeric output approaches the drain voltage while all other outputs remain at a voltage approaching the source voltage.

In accordance with an important aspect of the invention, the common drains and common sources of each alphanumeric output row of transistors are formed by a pair of parallel diffused regions, and the common gates of the binary input rows are formed by continuous, parallel metallized films extending transversely over the parallel diffused regions and insulated from the diffused regions by an oxide layer so that a potential MOS transistor is formed under each metallized film between each diffused source and drain region. The oxide layer is then made thin at the points where a transistor is needed and made thick where a transistor is not needed in order to implement the binary code.

In accordance with still another aspect of the invention, the alphanumeric outputs are connected to the inputs of a light matrix driver circuit. Thus, each of the alphanumeric outputs is connected to a metallized input gate strip. The input gate strips extend in parallel relationship over a plurality of elongated, parallel diffused source regions disposed transversely of the input gate strips. An elongated diffused drain region is disposed adjacent each source region so that a potential transistor is formed under each input gate strip and between each adjacent source and drain region. Each of the source regions forms a light driver output for controlling one light of a light matrix adapted to visually produce alphanumeric characters when certain combinations of the light sources are energized. Transistors are formed at selected intersections by providing a thin oxide layer between the input gate strips and the substrate, and transistors omitted by providing a thick oxide. The transistors are arranged such that when each input, representing an alphanumeric character, is at the level representing a logic "1" output, each of the light driver outputs for the light sources necessary to form the character on the matrix are connected to the drain by a transistor.

In accordance with another important aspect of the invention, each of the light driver outputs is connected to directly drive the base of a transistor which is switched "on" to drive the light source or other load.

The novel features believed characteristic of the invention are set forth in the appended claims. The invention itself, however, as well as other objects and advantages thereof, may best be understood by reference to the following detailed description of an illustrative embodiment, when read in conjunction with the accompanying drawings, wherein:

Figure 1:
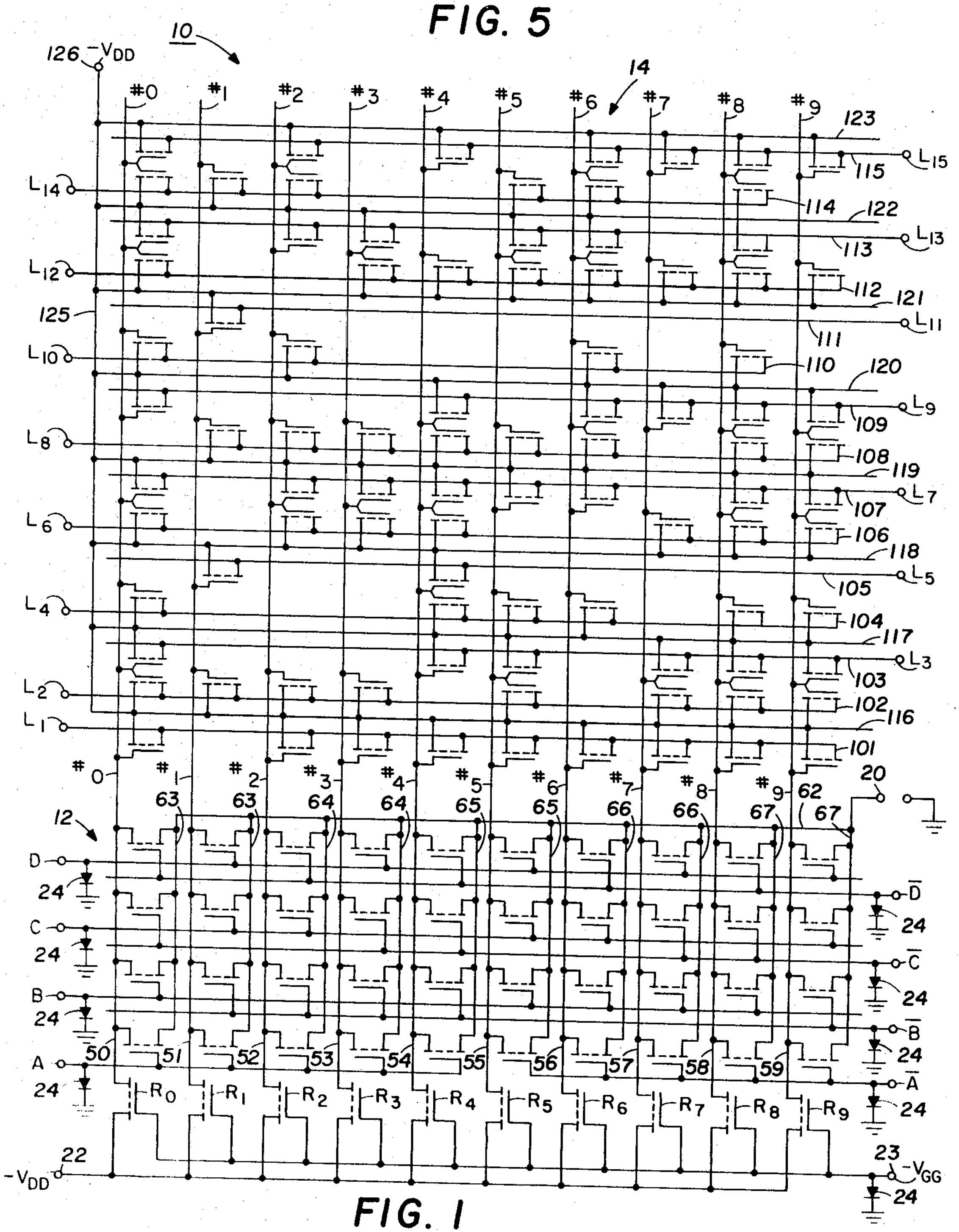
FIG. 1 is a schematic circuit diagram of a binary-to-decimal decoder and light matrix driver constructed in accordance with the present invention.

Referring now to the drawings, a circuit device constructed in accordance with the present invention is indicated generally by the reference numeral 10 in FIG. 1. The device 10 is comprised of a binary-to-decimal decoding section, indicated generally by the reference numeral 12, which has true binary inputs A, B, C and D, complement binary inputs $\overline{A}$, $\overline{B}$, $\overline{C}$ and $\overline{D}$, and ten decimal outputs #0–#9. The ten outputs #0–#9 drive the corresponding decimal inputs of a light matrix driver section, indicated generally by the reference numeral 14, which has fifteen outputs L1–L15 for driving the lights designated by the same reference characters in the three by five light matrix indicated generally by the reference numeral 16 in FIG. 2. The binary-to-decimal decoding section 12 is comprised of a plurality of enhancement mode, P-channel MOS transistors which are arrayed in eight binary input rows and ten decimal output rows. The gates of the transistors in each of the eight binary input rows are common, and the common gates form the eight binary inputs A, B, C and D, and $\overline{A}$, $\overline{B}$, $\overline{C}$ and $\overline{D}$. The drains of the transistors in each of the decimal output rows are common and form the decimal outputs #0–#9. The common drains #0–#9 are connected to a drain supply voltage terminal 22 by MOS transistors R0–R9, respectively. The gates of transistors R0–R9 are common and are connected to a reference voltage supply terminal $-V_{GG}$ so that the transistors will provide a substantially constant resistance for producing an output voltage. The sources of all the transistors in the array are common and connected to a source terminal 20.

Each decimal output row has four transistors, which are located in the eight binary input rows in a manner to achieve decoding. When a logic "0," typically about ground potential, is applied to the base of all four transistors in a given decimal output row, the transistors are turned "off" and the output goes to a logic "1" level, which approaches the negative drain voltage. If the gate of any one of the transistors is a logic "1," which is a negative voltage, that transistor is turned "on" and the decimal output goes to a logic "0" level of approximately ground potential.

Figures 2, 3, 6, 7:
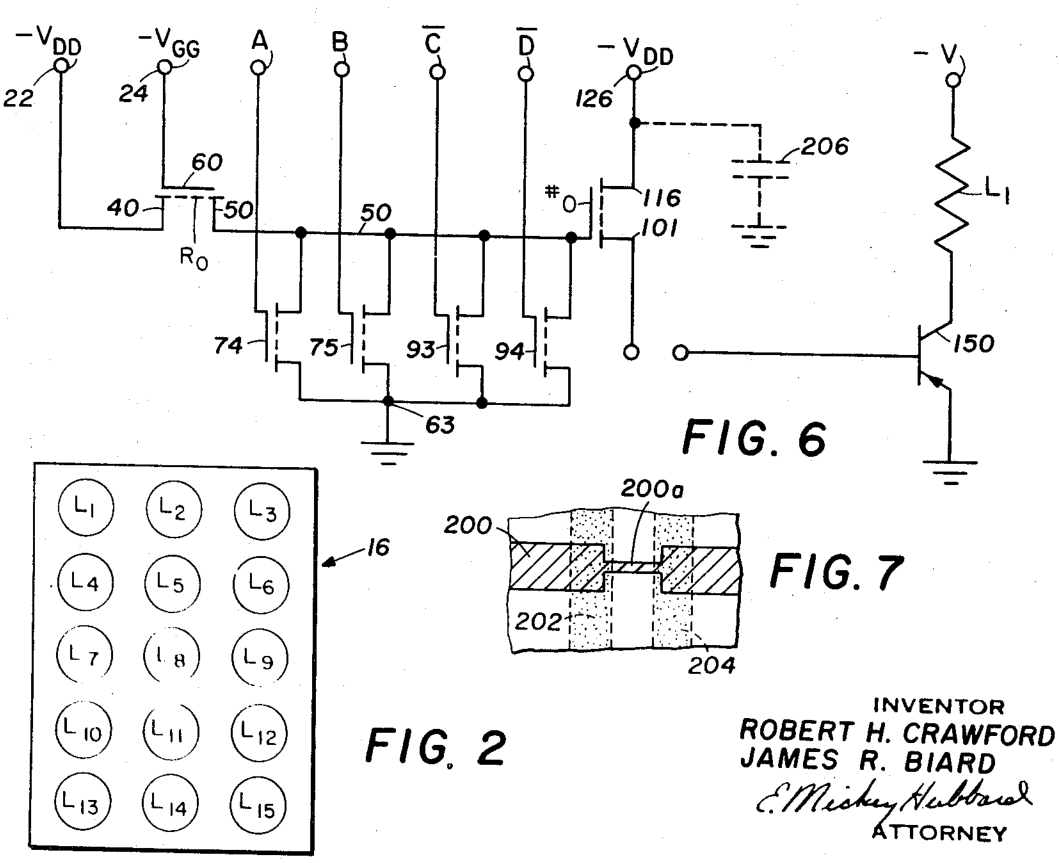
FIG. 2 is a schematic drawing of a light matrix driven by the circuit of FIG. 1.
FIG. 3 is a truth table for the circuit of FIG. 1.
FIG. 6 is a simplified schematic circuit diagram of the circuit illustrated in FIG. 4.
FIG. 7 is a simplified drawing illustrating an alternative embodiment of the invention.

The decoder section 12 is connected so as to utilize the execess three binary code as set forth in the left-hand section of the truth table shown in FIG. 3. Thus, the gates of the four transistors in decimal output row #0 are connected to inputs A, B, $\overline{C}$ and $\overline{D}$. The gates of the transistors in decimal output row #1 are connected to inputs A, $\overline{B}$, C and D. The gates of the transistors in output row #2 are connected to inputs A, $\overline{B}$, C and $\overline{D}$. The gates of the transistors in output row #3 are connected to inputs A, $\overline{B}$, $\overline{C}$ and D. The gates of the transistors in output row #4 are connected to inputs A, $\overline{B}$, $\overline{C}$ and $\overline{D}$. The gates of the transistors in output row #5 are connected to inputs $\overline{A}$, B, C and D. The gates of the transistors in output row #6 are connected to inputs $\overline{A}$, B, C and $\overline{D}$. The gates of the transistors in output row #7 are connected to inputs $\overline{A}$, B, $\overline{C}$ and D. The gates of the transistors in output row #8 are connected to inputs $\overline{A}$, B, $\overline{C}$ and $\overline{D}$, and the gates of the transistors in output row #9 are connected to inputs $\overline{A}$, $\overline{B}$, C and D. Each of the true and complement inputs is connected to ground by a reverse biased field plate diode 24 to protect the various transistor gate dielectrics against static over voltage.

The light matrix driver section 14 has a plurality of transistors arrayed in ten decimal input rows and fifteen light driver output rows. The gates of the transistors in each of the decimal input rows are common and form the decimal inputs #0–#9 of the driver section 14 which are connected to the decimal outputs #0–#9 of the decoder section. The sources of the transistors in each of the light driver output rows are common and form the outputs L1–L15. The drains of all the transistors are common and are connected to terminal 126. Thus, when any one of the decimal inputs #0–#9 is at a logic "0" level, i.e., essentially ground, the transistors in the corresponding input row are turned "off." If the decimal input is a logic "1," i.e., a negative voltage approaching the supply voltage, all of the transistors in that input row are turned "on" and an output current flows through all of the light driver output rows having a transistor in that particular decimal input row. Thus, when decimal output #0 goes to a logic "1" level, light driver outputs L1–L4, L6, L7, L9, L10 and L12–L15 are all turned "on" and each of these outputs then sinks current as will presently be described. Similarly, when decimal output #1 is at a logic "1" level, outputs L2, L5, L8, L11 and L14 are connected to the negative voltage supply terminal 126 and therefore sink current. Decimal output #2 is connected to the gates of transistors which connect outputs L1, L2, L6–L8, L10 and L13–L15 to the negative voltage supply terminal 126.

Decimal output #3 is connected to the gates of transistors in light driver output rows L1, L2, L6–L8 and L12–L14. Decimal output #4 similarly is connected to the gates of transistors connecting outputs L1, L3, L4, L6–L9, L12 and L15 to terminal 126. Decimal output #5 is connected to the gates of transistors connecting outputs L1–L4, L7, L8 and L12–L14 to terminal 126. Decimal output #6 is connected to the gates of transistors connecting outputs L1, L4, L7–L10 and L12–L15 to terminal 126. Decimal output #7 is connected to the gates of transistors connecting outputs L1–L3, L6, L9, L12 and L15 to the drain voltage. Decimal output #8 is connected to the gates of transistors connecting outputs L1–L4, L6–L10 and L12–L15 to terminal 126, and decimal output #9 is connected to the gates of transistors connecting outputs L1–L4, L6–L9, L12 and L15 to terminal 126.

Figure 4:
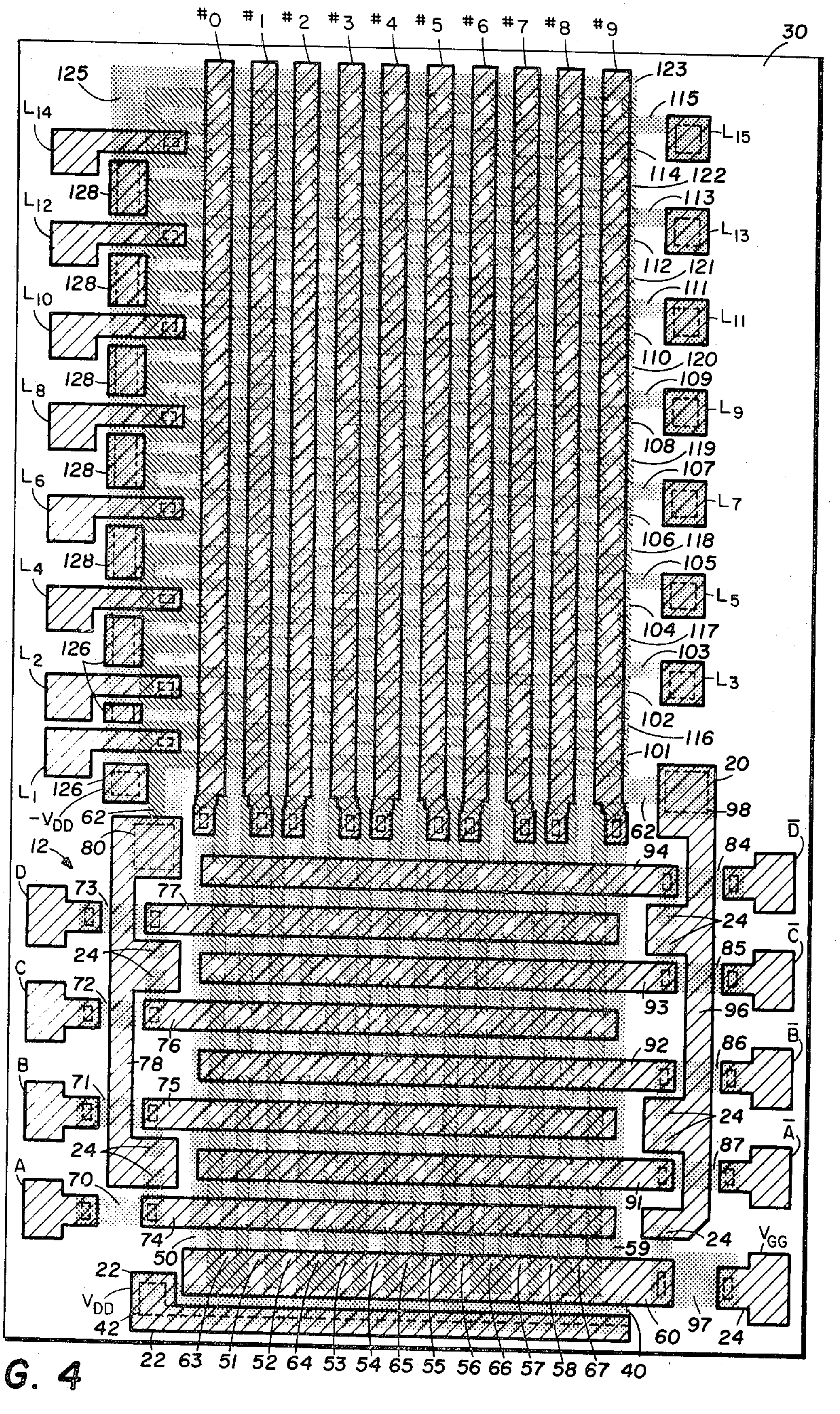
FIG. 4 is a plan view of an integrated circuit chip embodying the circuit of FIG. 1.

In accordance with an important aspect of the invention, the circuit 10 of FIG. 1 is implemented in integrated circuit form as illustrated in FIG. 4. The circuit is formed on a single n-type substrate 30. The stippled regions designate areas in which p-type diffusions have been made, the diffusions being made during a single diffusion step. An oxide layer is formed over the entire surface of the substrate 30, including the diffused areas, but is substantially thicker around the periphery of the slice and also in the areas indicated by the close cross-hatching. For example, the oxide layer may be about 10,000 angstroms thick in the cross-hatched areas, as compared to about 1500 angstroms thick in the remaining areas. The areas defined by the solid peripheral lines and the more widely spaced cross-hatching are aluminum films deposited over the oxide layer to form gate strips and conductors, and the dotted rectangular areas within these areas are windows in the oxide layers where the aluminum film makes electrical contact with the underlying diffused regions. Active MOS transistors are formed between adjacent diffused source and drain regions only where the channel between the regions is covered by thin oxide and an aluminum gate. The thick areas of the oxide prevent a negative voltage on an overlying aluminum plate from inducing a channel between adjacent diffused regions.

The various components common to both FIGS. 1 and 4 are designated by the same reference characters. In the actual circuit of FIG. 4, terminal 22 is an elongated strip of aluminum which is in ohmic contact with an underlying diffusion 40 as a result of the window 42 shown in dotted outline. Elongated diffused regions 50–59 are disposed in parallel relationship at right angles to the diffused region 40 so that the channels of transistors R0–R9 are formed between the ends of regions 50–59 which form the sources, and region 40 which forms a common drain. An aluminum film 60 forms a common gate for the transistors R0–R9. It will be noted that the oxide layer is thin between the ends of the diffused regions 50–59 and the diffused region 40 so that MOS transistors will be formed. A single source diffusion 62 has fingers 63–67 formed between each adjacent pair of diffused drain regions 50 and 51, 52 and 53, 54 and 55, 56 and 57, and 58 and 59, respectively. It will be noted that a thick oxide is provided between the ends of the diffused regions 63–67 and the diffused region 40 to prevent the formation of an MOS transistor under the gate metallization strip 60.

Inputs A, B, C and D are connected through diffused regions 70–73 to metallized gate strips 74–77, respectively, which extend orthogonally across all of the parallel diffused regions 50–59 and 63–67. Tabs are provided on the diffused regions 70–73 which extend under an aluminized plate 78 to form protective field plate diodes 24. The plate 78 is connected to the diffused region 62 through the window 80 cut in the silicon oxide which, of course, separates and insulates the layer 78 from the underlying diffused regions 70–73. Similarly, complement inputs $\overline{A-D}$ are connected through diffused regions 84–87 to metallized gate strips 90–93 which extend orthogonally over all of the diffused regions 50–59 and 63–67. A metallized strip 96 extends over spurs of the diffused regions 84–87, and over a spur of diffused region 97 to form protective diodes 24 between each of the inputs and ground, and the metallized strip 96 is connected to the diffused region 62 through an opening 98 cut in the oxide. The strip 96 also provides the expanded contact terminal 20 which is connected to ground.

Figure 5:
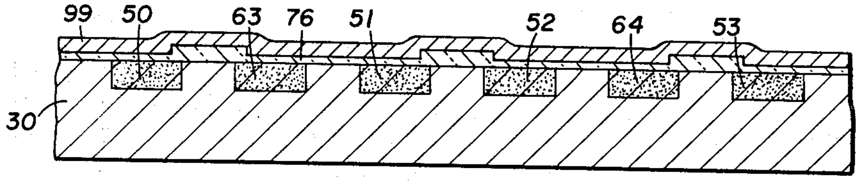
FIG. 5 is a schematic sectional view illustrating the construction of the circuit in FIG. 4.

Each of the diffused regions 50–59 essentially forms the decimal outputs #0–#9. The MOS transistors connecting the decimal output #0–#9 to the source diffusions are formed by a thin oxide layer under the approriate gate strips 74–77 or 91–94, and between the regions 50–59 and the adjacent source regions 63, 67. Thus, the MOS transistors in decimal output row #0 are formed between gate strips 74, 75, 93 and 94. The transistors in decimal output row #1 are formed between drain region 50 and source region 63 under gate strips 74, 92, 76 and 72. The transistors in decimal output row #2 are formed between drain 52 and source 64 under gate strips 74, 92, 76 and 94. The transistors in output row #3 are formed between drain 53 and source 64 under gate strips 74, 92, 93 and 77. The transistors in output row #4 are formed between drain 54 and source 65 under gate strips 74, 92, 93 and 94. The transistors in output row #5 are formed between drain 55 and source 65 under gate strips 91, 75, 76 and 77. The transistors in output row #6 are formed between drain 56 and source 66 under gate strips 91, 75, 76 and 94. The transistors in output row #7 are formed between drain 57 and source 66 under gate strips 91, 75, 93 and 77. The transistors in output row #8 are formed between drain 58 and source 67 under gate strips 91, 75, 93 and 94, and the transistors in output row #9 are formed between drain 59 and source 67 under gate strips 91, 92, 76 and 77. A cross section of a portion of the substrate underlying gate strip 76 is illustrated in FIG. 5. It will be noted that the oxide layer 99 is thick between drain 50 and source 63, and between drains 51 and 52, so that MOS transistors are not formed between thees diffused regions, but is thin between drain 51 and source 63, and between drain 52 and source 64, so that active MOS transistors are formed.

The decimal inputs of the light matrix driver section are the metallized gate strips #0–#9 which are connected to the drain regions 50–59, respectively, and extend in parallel relationship, one with respect to the other, away from the diffused regions 50–59. A second set of diffused regions 101–115 form the sources of the transistors in the light driver output rows and are disposed in parallel relationship and extend orthogonal to the input gate strips #0–#9. Metallized expanded contact pads are in ohmic contact with the diffused regions 101–115, respectively, through openings cut in the oxide layer and form the light driver outputs L1–L15. Drain regions 116–123 are formed between each adjacent pair of the diffused regions 101–115, and are common with a diffused region 125. An expanded aluminum contact 126 is in ohmic contact with the diffused region 125, for connecting the diffused region to the drain supply voltage. Aluminum areas 128 are provided to reduce the resistance of the diffused region 125.

Active MOS transistors are formed under the gate strips #0–#9 between the source regions 101–115 and the adjacent drain regions 116–123 where the oxide is thin as heretofore described. Thus, under gate strip #0, MOS transistors are formed between regions 101 and 116, 103 and 117, 104 and 117, 106 and 118, 107 and 119, 109 and 120, 110 and 120, 112 and 121, 113 and 122, 114 and 122, and 115 and 123. Active MOS transistors are formed under gate strip #1 between diffused regions 102 and 116, 105 and 118, and 114 and 122. Active MOS transistors are formed under gate strip #2 between diffused regions 101 and 116, 102 and 116, 103 and 117, 106 and 118, 107 and 119, 108 and 119, 109 and 120, 110 and 120, 113 and 122, 114 and 122, and 115 and 123. Active MOS transistors are formed under gate strip #3 between regions 106 and 116, 102 and 116, 103 and 117, 106 and 118, 108 and 119, 109 and 120, 112 and 121, 113 and 122, 114 and 122, and 115 and 123. Active MOS transistors are formed under gate strip #4 between regions 101 and 116, 103 and 117, 104 and 117, 106 and 118, 107 and 119, 108 and 119, 109 and 120, 112 and 121, and 115 and 123. Active transistors are formed under gate strip #5 between regions 101 and 116, 102 and 116, 103 and 117, 104 and 117, 107 and 119, 108 and 119, 109 and 120, 112 and 121, 113 and 122, 114 and 122, and 115 and 123. Active transistors are formed under gate strip #6 between regions 101 and 116, 102 and 116, 103 and 117, 104 and 117, 107 and 119, 108 and 119, 109 and 120, 110 and 120, 112 and 121, 113 and 122, 114 and 122, and 115 and 123. Active MOS transistors are formed under gate strip #7 between diffused regions 101 and 116, 102 and 116, 103 and 117, 106 and 118, 109 and 120, 112 and 121, and 115 and 123. Active MOS transistors are formed under gate strip #8 between diffused regions 101 and 116, 102 and 116, 103 and 117, 104 and 117, 106 and 118, 107 and 119, 108 and 119, 109 and 120, 110 and 120, 112 and 121, 113 and 122, 114 and 122, and 115 and 123. Active MOS transistors are formed under gate strip #9 between diffused regions 101 and 116, 102 and 116, 103 and 117, 104 and 117, 106 and 118, 107 and 119, 108 and 119, 109 and 120, 112 and 121, 113 and 122, 114 and 122, and 115 and 123.

The operation of the circuit 10 as implemented on the substrate 30 is best understood by reference to the simplified schematic circuit diagram of FIG. 6 wherein corresponding components are designated by the corresponding reference characters. For purposes of illustration, the true binary input A, decimal output #0 and a transistor 150 driven by light drives output L1 for controlling current to light L1 of the matric 16 are selected. In operation, terminals 22 and 126 are connected to a negative voltage supply designated $-V_{DD}$. Terminal 24 is connected to a negative reference voltage designated $-V_{GG}$ that is more negative than the drain voltage $-V_{DD}$. As a result, MOS transistor R0 formed under gate strip 60 between diffused regions 40 and 50, which is representative of all the transistors R0–R9, exhibits a particular resistance. Binary inputs A, B, $\overline{C}$ and $\overline{D}$ control decimal output #0. A logic "1" level is a negative voltage, and a logic "0" is essentially ground potential. The MOS transistors are enhancement mode p-channel devices and accordingly do not conduct when the gates are at ground potential, corresponding to a logic "0" level, but do conduct when a negative voltage corresponding to a logic "1" level is applied to the respective gates. Thus, if any one of the inputs A, B, $\overline{C}$ or $\overline{D}$ is at a negative voltage corresponding to a logic "1" level, the corresponding MOS transistor formed between diffused regions 50 and 63 and under the respective gate strips 74, 75, 93 or 94 will conduct, and decimal output #0 will be at ground potential, which is a logic "0" level. As a result, the MOS transistor formed under output gate strip #0 between diffused regions 101 and 116, which is representative of all transistors formed under gate strip #0, will not conduct. Thus, output L1 cannot sink current through that MOS transistor, and if all other transistors in light driver output row #1 are turned "off," transistor 150 will be turned "off" and light source L1 will also be turned "off." However, if all of the inputs A, B, $\overline{C}$ and $\overline{D}$ are at a logic "0" level so as to represent the decimal value "0" as can be seen from the truth table in FIG. 3, then the four MOS transistors in decimal output row #0 will be turned "off" so that the decimal output #0 will be at a minus voltage corresponding to a logic "1" level, and the MOS transistor formed under gate strip #0 between diffused regions 101 and 116 will conduct, thus sinking base current from transistor 150, turning it "on" and illuminating light source L1. In the same manner, all other MOS devices formed under gate strip #0 will also be conductive so as to provide a current sink for the transistors 150 driving light sources L2–L4, L6, L7, L9, L10 and L12–L15 and thus form the numeral zero. Similarly, when inputs A, $\overline{B}$, C and D are all at a logic "0" level, the voltage at decimal output #1 goes negative so that light sources L2, L5, L8, L11 and L14 are turned "on" to indicate the numeral one. A similar result is obtained from the remaining eight input combinations set forth in the truth table of FIG. 3.

Although the binary-to-decimal decoding section 12 only has the ten decimal outputs, it will be appreciated that the decoder can be expanded to convert a five digit binary input to thirty-two alphanumeric or other outputs, or a six digit binary input to a sixty-four character output. This can be achieved merely by increasing the number of true and complement inputs and the number of outputs. Similarly, the light matrix and light matrix driver section can be expanded to provide a light matrix of substantially any size and configuration desired.

The binary code used in the device can be changed merely by changing the oxide pattern to form the transistors in different rows. Thus, a single diffusion pattern and a single metallized film pattern is used, and to change binary codes, only a different pattern is used to form the thin and thick oxide layer. The oxide layer can be formed by first forming a layer over the surface of the wafer and then removing the layer completely in the areas where a thin oxide is to be formed. Then the thin oxide layer can again be formed over the wafer, either before or after the diffused regions. The oxide may be either a low temperature oxide formed by deposition, or a high temperature oxide formed by oxidation of the surface of a silicon wafer.

In accordance with an alternative embodiment of the invention, the transistors may be omitted from the various rows to achieve decoding by using a uniformly thin layer of oxide between the diffused regions and the metallized gate strips, and then making the gate strips sufficiently narrow at the points where a transistor is not to be formed, as illustrated in FIG. 7, so that the potential transistor will not be effective. Thus, the gate strip 200 has a necked portion 200a extending over the channel region between source diffusion 202 and drain diffusion 204. If low threshold MOS transistors are used to provide increased speed of operation, then both a thick oxide layer and a necked or narrow gate can be used to prevent the formation of a channel at the intersection where no transistors are desired.

The device 10 has a relatively high speed of operation as a result of the fact that the light driver outputs provide a current output, rather than a voltage output. Since the stray capacitance of the MOS transistors in the light matrix drive section, as represented by capacitor 206 shown in dotted outline in FIG. 6, is continually charged, the current output, actually a current sink for the base current of transistor 150, is almost instantaneous. Thus, the only capacitative delay in the circuit is the delay in the voltage swing of the decimal outputs of the decoder section.

Although preferred embodiments of the invention have been described in detail, it is to be understood that various changes, substitutions and alterations can be made therein without departing from the spirit and scope of the invention as defined by the appended claims.

What is claimed is:

1. A binary-to-alphanumeric decoder comprising a semiconductor substrate having a plurality of insulated gate field effect transistors formed at selected locations thereon, the transistors being arrayed in a number of binary input rows corresponding to twice the number of binary digits to form true and complement input rows for each binary digit, and a number of alphanumeric output rows equal to the number of alphanumeric characters represented by the binary inputs, the input and output rows being disposed generally in orthogonal relationship, the gates of the transistors in each binary input row being common and constituting the true or complement binary input, the drains of the transistors in each alphanumeric output row being common and forming a single alphanumeric output, the sources of all the transistors being common, the transistors in each alphanumeric output row being equal in number to the number of true binary inputs and which are at the input level for turning the transistors "off" when the binary inputs represent that particular alphanumeric output whereby each alphanumeric output will be at essentially the drain potential when the binary input number represents that particular alphanumeric output and will be essentially at the source potential for all other binary input numbers.

2. The combination defined in claim 1 wherein the drains of the transistors in each output row are formed by an elongated diffused region, the sources of the transistors in each output row are formed by an elongated diffused region extending parallel to the drain region and disposed adjacent the drain regions to form a continuous channel therebetween, the gates of the transistors in each input row are formed by a common gate strip extending transversely of the diffused regions, and the transistors are formed by providing a relatively thin oxide layer under the gate strips and over the channel region defined by the adjacent diffused source and drain regions, and a relatively thick oxide layer in such areas where transistors are not required.

3. The combination defined in claim 1 further characterized by a light matrix driver circuit, the light matrix driver circuit comprising a plurality of MOS type transistors formed on the semiconductor substrate, the transistors being arrayed in a number of alphanumeric input rows corresponding to the number of alphanumeric outputs of the decoder and a number of light driver output rows corresponding to the number of lights of a light matrix to be controlled by the driver circuit, the gates of the transistors in each of the alphanumeric input rows being common and being connected to an alphanumeric output of the decoder, the drains of all of the transistors being common and the sources of the transistor in each of the light driver output rows being common to form a light driver output, each light driver output row including a transistor in an alphanumeric input row for which the particular light driven by the light driver output is lighted to form the alphanumeric character represented by the alphanumeric output from the decoder.

4. The combination defined in claim 3 wherein the sources of the transistors in each light driver output row are formed by a common elongated source diffusion, and drains of the transistors are formed by a common elongated drain diffusion disposed parallel to the source diffusion, the elongated drain and source diffusions of the transistors being disposed in substantially parallel relationship, the gates of the transistors in each of the alphanumeric input rows are formed by a common gate strip extending transversely across the diffused regions, and the transistors are formed by providing a relatively thin oxide layer between the gate strips and the channel region between the diffused source and drain regions, and a relatively thick oxide layer in such areas where transistors are not required.

5. The combination defined in claim 3 further characterized by a transistor for each of the light driver outputs, the light driver output being connected to drive the base of the respective transistors, the respective transistors being connectable to control power to a load.

6. The combination defined in claim 5 further characterized by a light matrix having a number of light sources corresponding to the number of light driver outputs, the current to each light source being controlled by the transistor driven by the respective light driver output.

7. An integrated semiconductor circuit comprising a semiconductor substrate having a plurality of metal-insulator-semiconductor transistor arrayed in sets of input and output rows, the sources and drains of the transistors in each row of one set being formed by common, elongated diffused regions disposed in generally parallel relationship and the transistors in the rows of the other set being formed under elongated generally parallel gate strips formed on an insulating layer over the diffused regions and extending orthogonally over the diffused regions to form a potential transistor at the intersection of each gate strip and the underlying source and drain regions, the structural characteristics of the area of the gate strip and the insulating layer under the gate strip at selected ones of said intersections being different than remaining ones of said intersections so as to form transistors only at said selected ones of said intersection.

8. The integrated semiconductor circuit defined in claim 7 wherein the insulating layer is thin at said selected ones of the intersections where a transistor is to be formed and thick at said remaining ones of said intersections.

9. The integrated semiconductor circuit defined in claim 7 wherein the width of the gate strips over said selected ones of said intersections where a transistor is formed is substantially greater than the width of the gate strips over said remaining ones of said intersections where a transistor is not formed.

10. A matrix of circuit components each having a source, drain and gate comprising a semiconductor substrate, a plurality of elongated diffused regions disposed in substantially parallel relationship on the surface of said semiconductor substrate, insulating material on said surface of said semiconductor substrate, a plurality of conductive strips formed on said insulating material over said diffused regions and extending over said diffused regions at angles thereto to form potential circuit components at the intersection of each strip and underlying adjacent diffused regions, said adjacent diffused regions comprising a common source and a common drain and said strips at the intersection comprising the gates of the potential circuit components, the structural relationship of the area of the conductive strip and the insulating material under such conductive strip at selected ones of said intersections being different than remaining ones of said intersections so as to form said circuit components only at said selected ones of said intersections.

11. The matrix according to claim 10, wherein the inulating material is thin at said selected ones of said intersections where circuit components are formed and thick at said remaining ones of said intersections.

12. The matrix of claim 10, wherein the width of the conductive strip at said selected ones of said intersections where circuit components are formed is substantially greater than the width of the conductive strip at said remaining ones of said intersections.

13. In a logic circuit having a matrix of insulated gate field effect transistors, the combination of:
a substrate of one conductivity type,
at least three generally parallel, elongated regions of the other conductivity type formed at one surface of the substrate,
insulating material disposed over the surface of the substrate, and
a plurality of generally parallel conductors disposed on said insulating material and extending over said at least three of said elongated regions at angles thereto to form potential insulated gate field effect transistors at the intersections of said conductors and adjacent pairs of said elongated regions, said adjacent pairs of said elongated regions comprising a common source and a common drain for a row of said potential transistors,
the structural relationship of the adjacent said elongated regions, the areas of said conductors, and the insulating material at selected intersections being such as to form transistors and being different at other intersections so as to prevent the formation of transistors thereat.

14. The logic circuit of claim 13 including:
a plurality of alternate ones of said elongated regions connected in common and the other ones of said elongated regions forming output lines and said conductors forming input lines.

15. The logic circuit of claim 14 including:
a second plurality of generally parallel, elongated regions of said other conductivity type formed at said one surface of said substrate,
a second plurality of generally parallel conductors disposed on said insulating material and extending over said second plurality of elongated regions at angles thereto to form a second set of potential transistors at the intersections of the second plurality of conductors and adjacent pairs of said second plurality of elongated regions,
the structural relationship of the adjacent said elongated regions of said second plurality, the areas of the second plurality of conductors, and the insulating material at selected intersections in said second set being such as to form transistors and being different at other intersections in said second set so as to prevent the formation of transistors thereat,
the second plurality of conductors being electrically connected to said output lines.

16. The logic circuit of claim 15 wherein:
alternate ones of said second plurality of elongated regions are connected in common, and
the other ones of said second plurality of elongated regions form output lines.

17. In a logic circuit having a matrix of insulated gate field effect transistors, the combination of:
a substrate of one conductivity type,
at least three generally parallel, elongated regions of the other conductivity type formed at one surface of the substrate,
insulating material disposed over the surface of the substrate, and
a plurality of generally parallel conductors disposed over said insulating material and extending over at least three of said elongated regions at angles thereto to form potential insulated gate field effect transistors at the intersections of said conductors and adjacent pairs of said elongated regions,
the thickness of said insulating material at selected intersections being thin to form said transistors and being thicker at the remaining intersections to prevent the formation of said transistors thereat.

18. In a logic matrix, the combination of:
a semiconductor substrate having a plurality of field effect transistors formed at selected locations thereon, the transistors being arrayed in a number of input rows and a number of output rows, the input and output rows being disposed generally in orthogonal relationship, the gates of the transistors in each input row being common, the drains of the transistors in each output row being common, the sources of the transistors in each output row being common and one of the sources or drains of all of the transistors being electrically connected in common.

19. In a logic matrix, the combination of:
a semiconductor substrate having first and second sets of field effect transistors formed at selected locations thereon,
the first set of transistors being arrayed in a first set of input rows and a first set of output rows,
the first set of input rows and the first set of output rows being disposed generally in orthogonal relationship,
the gates of the transistors in each input row of said first set being common, the drains of the transistors in each output row of said first set being common, the sources of all of the transistors of the first set being common.

the second set of transistors being arrayed in a second set of input rows and a second set of output rows displaced generally in orthogonal relationship, the gates of the transistors in each input row of the second set being connected to the drains of the transistors in the respective output rows of the first set, the sources of the transistors in each output row of the second set being common, and the drains of all of the transistors of the second set being common.

20. A logic matrix comprising a semiconductor substrate having:

a plurality of potential metal-insulator-semiconductors transistors formed thereon, the transistors being arrayed in a number of binary input rows corresponding to a plurality of binary input digits and a plurality of output rows, said output rows comprising substantially parallel semiconductor regions of the same conductivity type and comprising one of the source and drain regions of said potential transistors, the other of said source and drain regions of all of said potential transistors being connected in common, said input rows comprising generally parallel insulated gates of said potential transistors, the insulated gate of each of said potential transistors in an input row being common, said input rows overlying said output rows at an angle so that potential transistors are formed at the intersection of each insulated gate of an input row and underlying adjacent source and drain regions, the structural characteristics at selected ones of said intersections being different than at remaining ones of said intersections so that actual metal-insulator-semiconductor transistors are only formed at said selected ones of said intersections.

21. A logic matrix according to claim 20 wherein:

said structural characteristics comprise thin insulating material underlying said insulated gates at said selected ones of said intersections and thicker insulating material underlying the gate at the remaining ones of said intersections.

22. A logic matrix comprising:

a semiconductor substrate, a matrix of metal-insulator-semiconductor transistors formed at selected locations thereon, said transistors being arrayed in said matrix in a number of input rows corresponding to a number of binary digit inputs and a number of output rows corresponding to selected logic combinations of such inputs, the gates of the transistors in each input row being common, one of the drains or sources of the transistors in each output row being common and forming a single output row, the other of the drains or sources of all the transistors being common, and the input rows and output rows being disposed at an angle to one another on said substrate.

23. A decoder comprising:

a semiconductor substrate having a plurality of metal-insulator-semiconductor transistors formed at selected locations thereon, the transistors being arrayed in a number of binary input rows corresponding to twice the number of binary digits to form true and complement input rows for each binary digit, and the number of output rows equal to the number of decoded characters represented by the binary inputs, the input and output rows being disposed at angles to one another, the gates of the transistors in each binary input row being common and constituting the true or complement binary input, one of the sources and drains of the transistors in each output row being common and forming a single output, the other of the sources and drains of all the transistors being common, the number of transistors in each output row being related to the number of binary inuts for producing logic outputs representing desired combinations of said binary inputs and which are at the input level for placing the transistors of an output row in one state when the binary inputs represent that particular output and in another state when the binary inputs represent another output.

24. A decoder according to claim 23 wherein:

the drains of said transistors in each output row are formed by an elongated diffused region on said semiconductor substrate, the sources of said transistors in each output row are formed by an elongated diffused region and disposed adjacent said drain regions to form a continuous channel therebetween, the gates of said transistors in each input row are formed by a common gate strip extending traversely of said diffused regions, and said transistors are formed by providing a relatively thin insulating layer under said gate strips and over the channel region defined by the adjacent diffused source and drain regions, and a relatively thick insulating layer in such areas where transistors are not required.

25. A matrix of metal-insulator-semiconductor circuit components each having a source, drain and gate comprising a semiconductor substrate, a plurality of elongated diffused regions disposed in substantially parallel relationship on the surface of said semiconductor substrate, insulating material on said surface of said substrate, a plurality of conductive strips formed on said insulating material over said diffused regions and extending substantially orthogonally over said diffused regions to form potential circuit components at the intersection of each strip and underlying adjacent diffused regions, said adjacent diffused regions comprising a common source and a common drain and said overlying strips comprising the gates of said potential circuit components to form a plurality of rows of said potential circuit components, said potential circuit components of each row comprising a common source and common drain, the structural relationship of the area of the conductive strip and the insulating material under such conductive strip at selected ones of said intersections being different than at remaining ones of said intersections to form circuit components only at said selected ones of said intersections, whereby binary inputs are applied to said conductive strips and outputs are produced at said rows representative of desired combinations of said binary inputs.

26. The matrix according to claim 25, wherein the insulating material is thin at said selected ones of said intersections where a circuit component is formed and thicker at said remaining ones of said intersections.

References Cited

UNITED STATES PATENTS

| | | | |
|---|---|---|---|
| 3,461,347 | 8/1969 | Lemelson | 340—166 |
| 2,592,683 | 4/1952 | Gray | 340—173 |
| 3,204,234 | 8/1965 | Nakauchi | 340—166 |
| 3,315,248 | 4/1967 | Benn et al. | 340—324 |
| 3,355,598 | 11/1967 | Tuska | 317—235 |
| 3,358,198 | 12/1967 | Van Overbeek | 29—571 |
| 3,378,688 | 4/1968 | Kabell | 317—235 |

THOMAS B. HABECKER, Primary Examiner

M. M. CURTIS, Assistant Examiner

U.S. Cl. X.R.

235—154; 307—205, 251; 317—101; 340—166, 336, 347